(12) United States Patent
Jobanputra et al.

(10) Patent No.: US 12,192,266 B2
(45) Date of Patent: Jan. 7, 2025

(54) DATA TRANSFER MANAGEMENT FOR UNMANNED AERIAL VEHICLES

(71) Applicant: Skydio, Inc., Redwood City, CA (US)

(72) Inventors: Roshan Neel Jobanputra, San Francisco, CA (US); Jeffrey Robert DeCew, Somerville, MA (US); Jessica Lindsay Conser, Longmont, CO (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 17/969,838

(22) Filed: Oct. 20, 2022

(65) Prior Publication Data

US 2024/0137403 A1 Apr. 25, 2024
US 2024/0236169 A9 Jul. 11, 2024

(51) Int. Cl.
*H04L 67/06* (2022.01)
*H04L 67/12* (2022.01)

(52) U.S. Cl.
CPC ............. *H04L 67/06* (2013.01); *H04L 67/12* (2013.01)

(58) Field of Classification Search
CPC ..... H04L 12/1877; H04L 67/12; H04L 67/06; H04L 67/563
See application file for complete search history.

(56) References Cited

U.S. PATENT DOCUMENTS

| | | | | |
|---|---|---|---|---|
| 8,135,852 B2* | 3/2012 | Nilsson | ............ | H04N 21/23424 709/236 |
| 8,930,475 B1* | 1/2015 | North | ................. | G06F 21/6209 709/206 |
| 9,262,498 B2* | 2/2016 | Ferris | .................... | G06F 16/278 |
| 10,909,859 B1 | 2/2021 | Dodd | | |
| 10,999,357 B1* | 5/2021 | Lan | .......................... | H04L 67/12 |
| 2003/0051047 A1* | 3/2003 | Horel | .................... | H04L 67/565 707/E17.007 |
| 2016/0111006 A1 | 4/2016 | Srivastava et al. | | |
| 2017/0021946 A1 | 1/2017 | Weller et al. | | |
| 2017/0177609 A1* | 6/2017 | North | ....................... | H04L 67/06 |
| 2018/0072416 A1 | 3/2018 | Cantrell et al. | | |
| 2019/0223237 A1 | 7/2019 | Hong | | |
| 2020/0209892 A1 | 7/2020 | Luo et al. | | |
| 2020/0236174 A1* | 7/2020 | Evans | .................. | G05D 1/0011 |

(Continued)

FOREIGN PATENT DOCUMENTS

| | | |
|---|---|---|
| EP | 3858732 A1 | 8/2021 |
| WO | 2018080425 A1 | 5/2018 |
| WO | 2021046021 A1 | 3/2021 |

OTHER PUBLICATIONS

International Application No. PCT/US2023/076073, International Search Report, Written Opinion, 15 pages, Feb. 1, 2024.

*Primary Examiner* — Schquita D Goodwin
*Assistant Examiner* — Linh T. Nguyen

(57) ABSTRACT

Technology is disclosed herein to enable data transfer from unmanned aerial vehicles to cloud destinations. In an implementation, a relay resource in communication with a UAV sends a transfer request to a cloud service for managing data transfer for unmanned aerial vehicles. The request includes a unique identifier for the data file. The cloud service determines instructions for transferring the data file to a destination based on the file's unique identifier. The cloud service sends the transfer instructions to the relay resource via an API, the instructions including information for uploading the file to the destination.

20 Claims, 13 Drawing Sheets

(56) References Cited

U.S. PATENT DOCUMENTS

| | | | |
|---|---|---|---|
| 2021/0088337 A1* | 3/2021 | Koubaa | H04L 67/025 |
| 2021/0134162 A1* | 5/2021 | Sundaramurthy | G08G 5/0043 |
| 2021/0304620 A1* | 9/2021 | Selvarajan | G08G 5/003 |
| 2022/0055747 A1* | 2/2022 | Zhao | H04W 36/0033 |
| 2022/0083987 A1 | 3/2022 | Bhunia et al. | |

* cited by examiner

DATA TRANSFER MANAGEMENT FOR UNMANNED AERIAL VEHICLES

TECHNICAL FIELD

Various implementations of the present technology relate to unmanned aerial vehicles (UAVs) and, in particular, managing data transfer for UAVs.

BACKGROUND

When data is captured and stored on an unmanned aerial vehicle (UAV), the data may be downloaded to a destination where it can be accessed by an interested party. To transfer a data file from a UAV to a destination, such as a cloud-based data storage, the UAV may use an application programming interface (API) to communicate with the destination. For example, when the drone completes a task, an end-user may download and view the task data by means of an API. If, however, the drone undergoes a software update which reallocates the drone's onboard data storage and changes the storage location of data file, the API would no longer be able to access the file for downloading. Similarly, if a data file's storage destination is changed to a new location, then the drone (or, in some situations, a fleet of drones) may require a software update to transfer the data file to the new location.

In other scenarios, a drone's operations may be upgraded to provide improved capabilities, such as enhanced sensor or telemetry data collection. When the upgrade results in changing the filename of the collected data, the API associated with transferring the data may also require updating to remain functional. In addition, if a new functionality is implemented on the drone, handling the data associated with the new functionality may require modifying an existing API or developing a new one to download the corresponding data files to their destination.

When an existing API is updated to accommodate changes in data file handling or a new API is created to enable drones to transfer media associated with a new functionality, this adds to development costs along with adding overhead and complexity to the system. In situations involving a fleet of drones, deploying a new or updated API may require broadcasting a software update to the entire fleet. The need to distribute software updates as data handling requirements change tends to bog down development and use of new and existing UAV capabilities.

OVERVIEW

Systems, methods, and software are disclosed for managing data transfer from unmanned aerial vehicles. A cloud service for managing data transfer for unmanned aerial vehicles (UAVs) receives information via an API which tasks a UAV with transferring data produced by one or more elements onboard the UAV. The cloud service receives a request from a relay resource via a second API to transfer a data file which includes the data produced by the one or more elements onboard the UAV. The request includes a unique identifier for the data file. The cloud service determines instructions for transferring the data file to a destination based on the unique identifier. The cloud service sends the instructions to the relay resource via the second API which includes information for uploading the data file to the destination.

Technology is disclosed herein for operating a relay resource for UAVs. The relay resource receives a request from a UAV to transfer a data file from the UAV. The request includes a unique identifier for the data file. The relay resource sends the request with the unique identifier to a cloud service via an API and receives from the cloud service via the API instructions based on the unique identifier for transferring the data file to a destination. In an implementation, the relay resource receives the data file from the UAV and sends the data file to the destination according to the instructions.

A UAV is disclosed herein comprising a flight control system including one or more processors, one or more computer readable storage media, and program instructions stored on the computer readable storage media. When executed by the one or more processors of the flight control system, the program instructions direct the one or more processors to receive information from a cloud service which tasks the UAV with transferring data produced by one or more elements onboard the UAV. The cloud service received the information from an application portal via an API. The program instructions further direct the one or more processors to send a request to a relay resource to transfer a data file including the data produced by the one or more elements from the UAV. The request is sent via a second API and includes a unique identifier for the data file.

In some implementations, the UAV sends the data file to the relay resource via the second API. The relay resource transfers the file to a destination in the instructions. In other implementations, upon receiving confirmation of the transfer, the UAV deletes the data file from onboard data storage.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

Figure 1:
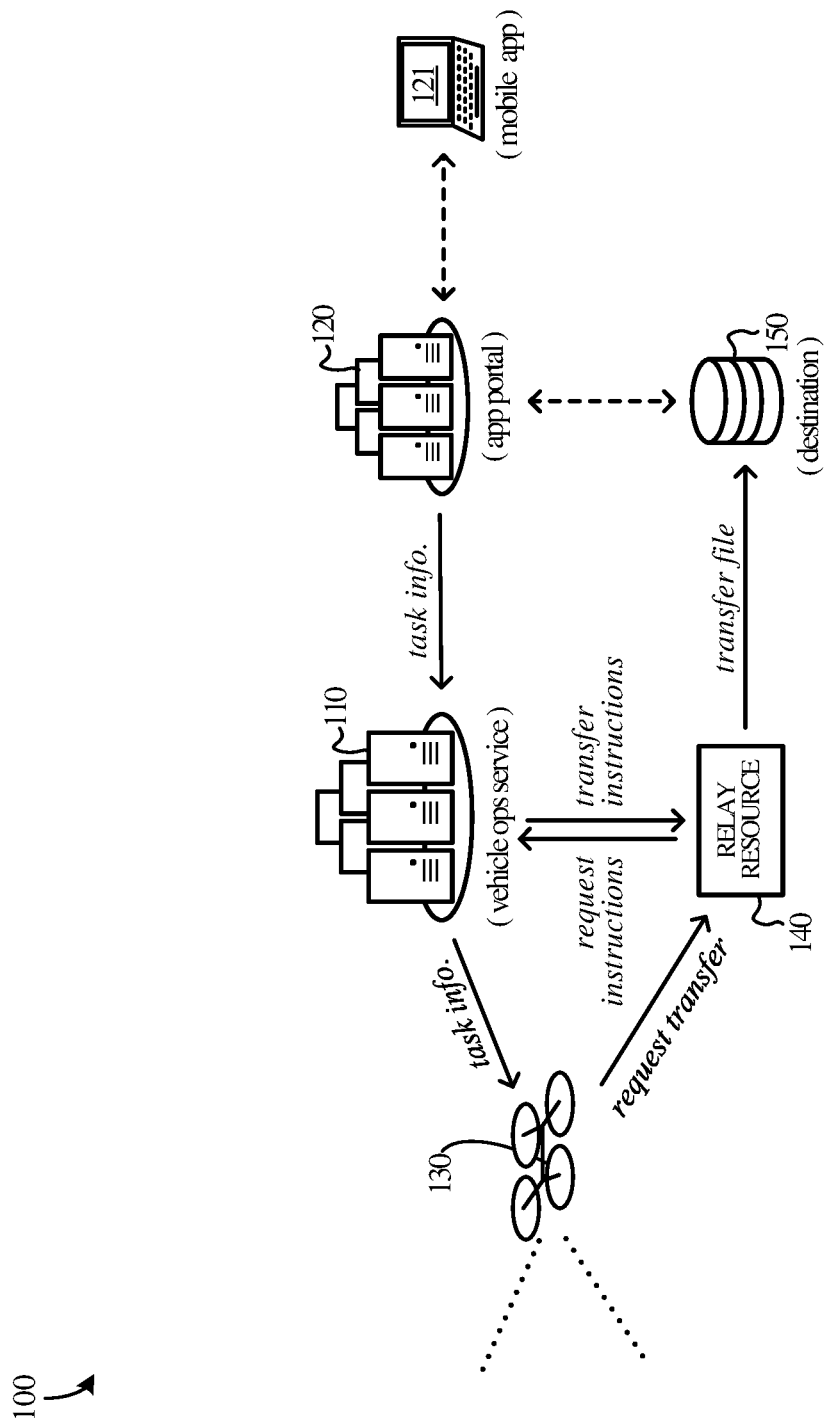
FIG. 1 illustrates an operational environment of managing data transfer for an unmanned aerial vehicle in an implementation.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Technology is disclosed herein to enable data transfer from a UAV to cloud destinations. (Herein, the terms "drone" and "vehicle" are used interchangeably with "UAV.") In an implementation, a vehicle is tasked by a user, such as a UAV dispatcher or operator, with performing a mission or task which entails collecting and storing data, such as sensor data or telemetry data. A data file of data acquired while performing the task is to be transferred to a destination from which an interested party can access the data.

In an implementation, the user may configure a task for a UAV in a client application for a cloud-based vehicle operations servicer. Information relating to the task may be sent to the cloud service by an application portal hosting the client application. Communication between the application portal and the cloud service may be transmitted via an API. The cloud service then sends information relating to the task to a vehicle assigned to the task.

During or upon completion of the task, the vehicle transmits a unique filename or identifier of the data file associated with the task to a relay resource. The relay resource receives the request and relays it via a second or "relay" API to the cloud service to obtain transfer instructions. The transfer instructions may include a destination of the data file as well as information pertaining to the transfer, such as an authorization key by which the relay resource can interface with the destination and an encryption key to ensure the integrity of the data. Upon obtaining the transfer instructions, the relay resource obtains the data file from the vehicle and transfers it to the destination according to the instructions.

In an implementation, the cloud service determines the transfer instructions, including destination information, based on a unique identifier of the data file to be transferred. The unique identifier may be configured by concatenating parameters relating to the vehicle, the vehicle's organization, the task and/or the data type. The cloud service stores transfer instructions or information pertaining to file transfer in a transfer log or database according to one or more of the filename parameters. For example, the unique filename or identifier for a data file may be created by a naming convention or rule which concatenates parameters of the task or flight, such as a flight identifier, a vehicle model designation, vehicle identifier, an organization identifier, and/or a data type or kind (e.g., "analytics_tar"). The cloud service may determine the file destination based on the organization and file type obtained by parsing the unique identifier according to the naming convention or rule.

The destination information of the transfer instructions may include a web address for the destination and an authentication key for uploading the data file to the destination. The cloud service then responds to the request by sending instructions for transferring the data file to the relay resource via the relay API.

When the relay resource receives the instructions for transferring the data file, the relay resource downloads the data file from the vehicle and uploads it to the destination according to the instructions. In an implementation, the relay resource receives a confirmation from the destination that the file has been successfully uploaded. The relay resource then sends to the vehicle an indication of the successful transfer, upon receipt of which the vehicle deletes the data file from its onboard storage. In the same or other implementations, the relay resource receives the unique identifier of the data file as well as the data file from the vehicle via the relay API.

In some implementations, when the relay resource receives the transfer instructions, the relay resource sends the transfer instructions to the vehicle. The vehicle then transfers the data file directly to the destination by establishing an Internet connection via a wireless access point, such as a Wifi router.

In various implementations, the relay resource is a service called by or executing within a mobile application operating on a mobile computing device or controller in wireless communication with the vehicle. In other implementations, the relay resource may be a service operated by the flight control system of the vehicle. For example, a Wifi-enabled drone may connect via a wireless access point to communicate with the cloud service which enables the onboard relay resource to request and obtain the transfer instructions from the cloud service and to transfer the data files to the destination.

In some implementations, an end-user may change a file destination or a vehicle setting which affects the transfer of data files. For example, a vehicle may produce data which is routinely transferred to a cloud data storage location. A end-user associated with the drone or its data seeking to change the destination of the data may designate the new destination to the cloud service which updates its transfer log or database accordingly. Subsequent to the update, when the relay resource requests transfer instructions for the data via the relay API, the cloud service determines and provides transfer instructions indicating the updated destination for the data.

In other implementations, the cloud-based vehicle operations service may receive from the client application an indication to upgrade the operational capabilities of a UAV.

For example, an end-user may configure or purchase vehicle settings (e.g., "premium features") which enable new or upgraded vehicle functionalities, such as telemetry data collection or automated file uploading from the vehicle via the vehicle's Wifi connectivity.

When the end-user configures a change to the vehicle settings, the vehicle operations service assembles a configuration package or bundle of vehicle settings and transmits the configuration package to the vehicle. The cloud service may also store or update the pertinent transfer information in its file transfer log or database. For example, if the end-user enables an upgrade for telemetry data collection, the cloud service will update its database to indicate the destination information for vehicles upgraded to collect telemetry data and will send to the upgraded vehicles a configuration package of vehicle settings to enable telemetry data collection and storage.

Similarly, if the end-user enables automated file uploading from the vehicle, the cloud service will store or update the pertinent transfer information in its database and will send a configuration package implementing the upgraded functionality to the vehicle. Subsequent to the upgrade, when the vehicle seeks to transfer the telemetry data file, it will request transfer instructions from the relay resource according to the data file's unique identifier. The relay resource will obtain the transfer instructions from the cloud service and relay the instructions to the vehicle.

Turning now to the Figures, FIG. 1 illustrates an operational environment of managing data transfer for a UAV in an implementation. FIG. 1 includes a cloud-based vehicle operations service 110 which communicates with application portal 120 and vehicle 130. Vehicle 130 and vehicle operations service 110 communicate with relay resource 140, which in turn communicates with destination 150. Application portal 120 hosts a web application executing on computing device 121.

Figure 13:
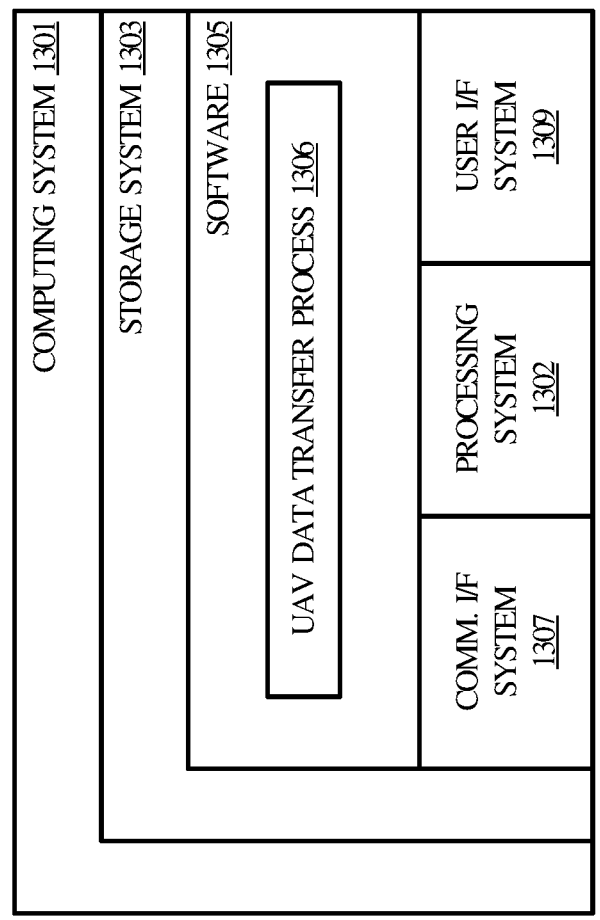
FIG. 13 illustrates a computing system suitable for implementing the various operational environments, architectures, processes, scenarios, and sequences discussed below with respect to the other Figures.

Vehicle operations service 110 is representative of one or more services (including microservices) capable of interfacing with computing devices and network-connected UAVs for vehicle operations management and for providing the data transfer processes, services, and methods described herein. Vehicle operations service 110 comprises services capable of interfacing with application portal 120 or with vehicle 130, or with other data services in communication with vehicle 130, such as relay resource 140, over one or more wired or wireless communication networks. In an implementation, vehicle operations service 110 comprises various subprocesses or subservices such as a vehicle data service or a UAV tasking service. Vehicle operations service 110 may be implemented in the context of one or more data centers and one or more computing devices of which computing device 1301 of FIG. 13 is representative.

Application portal 120 is representative of one or more services (including microservices) capable of interfacing with computing devices for vehicle operations management and for providing the data transfer processes, services, and methods described herein. Application portal 120 comprises services capable of interfacing with computing device 121, with vehicle operations service 110, or with other data services such as destination 150 over one or more wired or wireless communication networks. In an implementation, application portal 120 comprises services for hosting client applications for managing UAV operations. Application portal 120 may be implemented in the context of one or more data centers and one or more computing devices of which computing device 1301 of FIG. 13 is representative.

In an implementation, application portal 120 may be co-located with vehicle operations service 110.

Computing device 121 is representative of a computing device operated by a drone operator such as a vehicle dispatcher, a drone pilot or teleoperator, or other organizational personnel or stakeholder associated with vehicle 130 in an implementation. Computing device 121 is representative of a computing device, such as a laptop or desktop computer, or mobile computing device, such as a tablet computer or cellular phone, capable of communicating with application portal 120 over one or more wired or wireless communication networks. Computing device 121 executes a client application for vehicle operations such as data transfer operations. The client application communicates with application portal 120 including sending user input from the user interface of a client application to application portal 120 of vehicle operations service 110.

Vehicle 130 is representative of an unmanned aerial vehicle capable of communicating with vehicle operations service 110 over one or more wired or wireless communication networks. In an implementation, vehicle 130 may connect with a wireless access point (e.g., a Wifi router) for Internet access to cloud services such as vehicle operations service 110. Vehicle 130 is representative of a vehicle capable of performing various tasks, including capturing sensor or telemetry data, which may be configured by an end-user in the user interface of a client application on computing device 121 in communication with application portal 120 of vehicle operations service 110.

Relay resource 140 is representative of one or more services (including microservices) capable of interfacing with computing devices and unmanned aerial vehicles over one or more wired or wireless communication networks for providing the data transfer processes, services, and methods described herein. Relay resource 140 may be implemented in program instructions operating on one or more computing devices of which computing device 1301 of FIG. 13 is representative.

Destination 150 is representative of one or more services (including microservices) capable of interfacing with computing devices and unmanned aerial vehicles over one or more wired or wireless communication networks for providing the data transfer processes, services, and methods described herein. Destination 150 can comprise cloud data storage, video relay services, or other services for receiving, storing, sending, and otherwise managing sensor data (which may include imaging data or video data), telemetry data, or other types of data collected and stored by vehicle 130. Destination 150 may be implemented in program instructions operating on one or more computing devices of which computing device 1301 of FIG. 13 is representative.

In operation, computing device 121 executes a client application hosted by application portal 120 for vehicle operations service 110. Computing device 121 displays a user interface for configuring vehicle operations for vehicle 130, such as planning and scheduling vehicle tasks, obtaining vehicle or fleet status information, or accessing data collected by a vehicle. An end-user may also specify file destinations for data collected by vehicle 130 in the user interface of the client application. Interaction between the client application executing on computing device 121 and application portal 120 may be handled by an API.

In an implementation, vehicle operations service 110 receives, via application portal 120, a task or configuration package configured by an end-user in a client application executing in computing device 121. Vehicle operations service 110 assigns the task or sends the configuration package to vehicle 130. In an implementation, vehicle operations service 110 is a cloud-based service which communicates with vehicle 130 via a cloud API. Vehicle 130 may establish an Internet connection by connecting to a wireless access point, such as a Wifi router, by which vehicle 130 can communicate with vehicle operations service 110 or other cloud-based services.

In assigning a task, vehicle operations service 110 provides vehicle 130 with information tasking vehicle 130 with transferring data collected by one or more elements (e.g., sensors) onboard vehicle 130. Vehicle 130 performs a task during which data is collected. For example, vehicle 130 may collect sensor data (for example, photographs) including coordinates at various times during the mission as captured by an onboard camera. The filenames of the image data files are unique identifiers constructed according to a naming convention based on various parameters relating to the vehicle and the task. At the time the files are to be transferred, vehicle operations service 110 can determine transfer instructions for the file by parsing the unique identifiers according to the naming convention.

In sending a configuration package to vehicle 130, vehicle operations service 110 provides vehicle 130 with one or more vehicle settings which enable a vehicle functionality or enhance a functionality already in use. For example, an end-user may select an operational upgrade comprising telemetry data collection. Vehicle operations service 110 may transmit a configuration package to vehicle 130 which changes an onboard setting to enable telemetry data collection and transfer of the data file containing the collected data. The filename of the telemetry data file is a unique identifier constructed according to a naming convention based on various parameters relating to the vehicle and the task. At the time the file is to be transferred, vehicle operations service 110 can determine transfer instructions for the file by parsing the unique identifier according to the naming convention.

In an implementation, upon completing a mission for which vehicle 130 is tasked with transferring data collected during the mission, vehicle 130 transmits to relay resource 140 the unique filename of the data file. Relay resource 140 queries vehicle operations service 110, including the unique filename of the data file, to obtain transfer instructions.

When vehicle operations service 110 receives the unique filename of the data file, vehicle operations service 110 determines that the destination for the data file is destination 150. In an implementation, vehicle operations service 110 obtains transfer instructions for the data file from a database which correlates transfer information and instructions to one or more parameters contained within the unique identifier. Vehicle operations service 110 sends the transfer instructions to relay resource 140 identifying destination 150 as the destination and including other information for communicating with destination 150, such as the destination IP address and API key for destination 150.

Upon receiving the transfer instructions from vehicle operations service 110, relay resource 140 obtains the data file from vehicle 130 and uploads the file to destination 150 according to the transfer instructions. With the data file uploaded to destination 150, the end-user can access the data file from destination 150 directly or via application portal 120 for download, viewing, or other purposes.

After the file has been transmitted to destination 150, relay resource 140 may receive a confirmation of the successful upload from destination 150. Upon receiving confirmation of the upload, relay resource 140 may direct vehicle 130 to delete the uploaded file from its onboard data storage. In other implementations, vehicle operations service 110 may receive confirmation of the file upload from destination 150 which it then transmits to relay resource 140. Vehicle operations service 110 may also record in the transfer database the status of the data file such that if vehicle operations service 110 receives a duplicate request to transfer the data file, the reply to relay resource 140 will indicate that the data file does not need to be uploaded.

Figure 2:
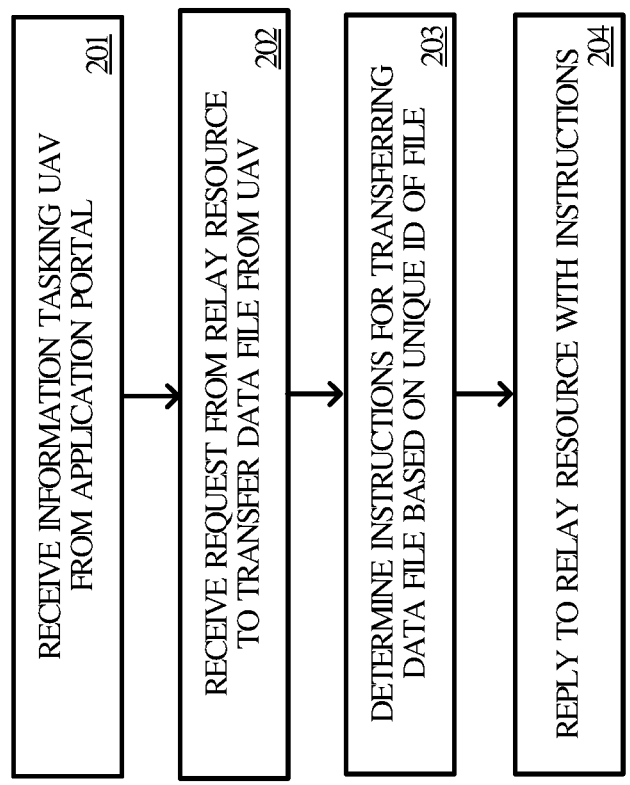
FIG. 2 illustrates a method of operating a cloud service for managing data transfer for unmanned aerial vehicles in an implementation.

Turning to FIG. 2, FIG. 2 illustrates process 200 implemented by a vehicle operations service, such as vehicle operations service 110 of FIG. 1, to manage data transfer for drones in an implementation. Referring to FIG. 2, process 200 may be implemented in program instructions in the context of any of the software applications, services, microservices, modules, components, or other such elements of a suitable operations service, such as vehicle operations service 110. The vehicle operations service may be implemented in the context of a data center or other such environment, and on one or more computing devices, of which computing device 1301 of FIG. 13 is representative. The program instructions direct the one or more computing devices that provide a vehicle operations service to operate as follows, referring parenthetically to the steps in FIG. 2.

In operation, the vehicle operations service receives information which tasks a vehicle with transferring data collected by one or more elements, such as onboard sensors or receivers (step 201). In an implementation, the vehicle operations service configures or receives transfer information, including file destinations, and stores the transfer information in a transfer log or database according to various parameters relating to the vehicle and/or the task. For example, a user, such as a UAV dispatcher, may configure a task or mission for a vehicle in a client application of the vehicle operations service which includes specifying a destination for the files of data collected by the vehicle while the vehicle performs the task. The destination may be a cloud data storage or other content handler, such as a video relay service. Alternatively, the vehicle operations service may assign destinations for data files according to the type of data collected or an attribute of the task, such as the organization associated with the assigned vehicle or the purpose of the task. The vehicle operations service transmits the task instructions to the vehicle selected to perform the task.

Continuing with FIG. 2, upon completing a task or mission and having collected data pertaining to the task or mission, the vehicle sends to a relay resource or service the unique identifier of the data file of the collected data to be downloaded from the vehicle. The relay service sends to the vehicle operations service a request for transfer instructions which includes the unique identifier of the to-be-transferred data file (step 202).

Next, the vehicle operations service determines the instructions for transferring the data file based on the file's unique identifier (step 203). To determine the instructions, the vehicle operations service parses the unique identifier for various parameters according to a naming convention used to construct the identifier. The cloud service uses one or more of the parameters extracted from the unique identifier to determine instructions for transferring the file. The cloud service determines the instructions by consulting a transfer log or database which correlates destination information and/or instructions to one or more of the extracted parameters. The transfer instructions may include a web address (e.g., a URL) of the destination and API authentication key for communicating with the destination. The instructions may also include an encryption key for encrypting the data for transfer.

The vehicle operations service transmits to the relay service the transfer instructions determined according to the unique identifier of the data file (step 204). The transfer instructions may include the information necessary for the relay service to communicate with the destination, such as a web address, authentication keys or credentials, encryption keys, and so on. The relay service, upon receiving the transfer instructions, implements the transfer by obtaining the data file from the vehicle and transmitting it to the destination. In an implementation, the vehicle encrypts the data file prior to transfer. In some implementations, the relay service may send the transfer instructions to the vehicle to transmit the data file to the destination directly (rather than through the relay resource) via the vehicle's wireless network connectivity or Internet connection.

In an implementation, when file transfer is complete, the destination sends a confirmation of the upload to the relay resource, which in turn sends the confirmation to the vehicle. In other implementations, when file transfer to the destination is complete, the vehicle operations service queries and receives the confirmation of the file upload from the destination which it then communicates to the relay service. Upon receiving confirmation of the upload from the relay resource, the vehicle deletes the data file from onboard storage.

Figure 3:
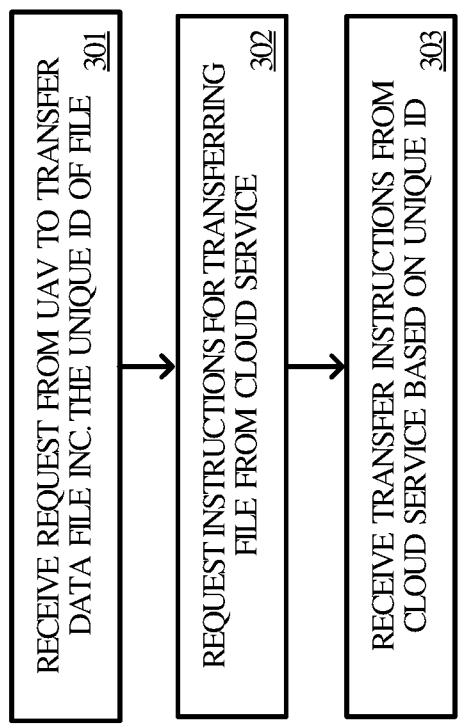
FIG. 3 illustrates a method of operating a relay resource for data transfer for unmanned aerial vehicles in an implementation.

FIG. 3 illustrates process 300 implemented by a relay resource, such as relay resource 140 of FIG. 1, for transferring data files from a vehicle to a destination in an implementation. Process 300 may be implemented in program instructions in the context of any of the software applications, services, micro-services, modules, components, or other such elements of a suitable operations service, such as relay resource 140 of FIG. 1. The relay resource may be implemented in the context of a data center or other such environment, and on one or more computing devices, of which computing device 1301 of FIG. 13 is representative. The program instructions direct the one or more computing devices that provide a data transfer service to operate as follows, referring parenthetically to the steps in FIG. 3.

A relay resource operating on computing device in wireless communication with a vehicle receives a request from the vehicle to transfer a data file to some destination (step 301). The request includes a unique identifier of the data file. The relay resource sends the unique identifier to a cloud service, such as a vehicle operations service, in a request for instructions for transferring the data file (step 302). The cloud service determines instructions for transferring the data file according to the unique identifier and transmits the instructions to the relay resource. The instructions include a destination for the data file and may also include other information for making the transfer, such as a web address, an authentication key, and an encryption key. The relay resource receives from the cloud service the instructions for transferring the data file to a specified destination (step 303). In an implementation, the relay resource receives the data file from the UAV and sends the data file to the specified destination according to the transfer instructions. In an implementation, the relay resource may receive and store the data file before uploading to the destination. For example, if the computing device executing the relay resource is in wireless communication with the destination, the relay resource may store the data file until the computing device detects sufficient signal strength to complete the transfer.

In an implementation, upon completing transfer of the data file, the relay resource may receive confirmation of the upload from the specified destination. The relay resource then sends a confirmation of the transfer to the vehicle which prompts the vehicle to delete the data file from its onboard data storage.

Figure 4:
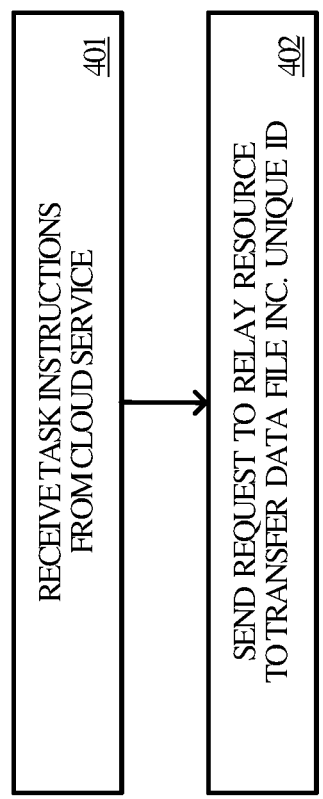
FIG. 4 illustrates a method of operating an unmanned aerial vehicle in an implementation.
Figure 12:
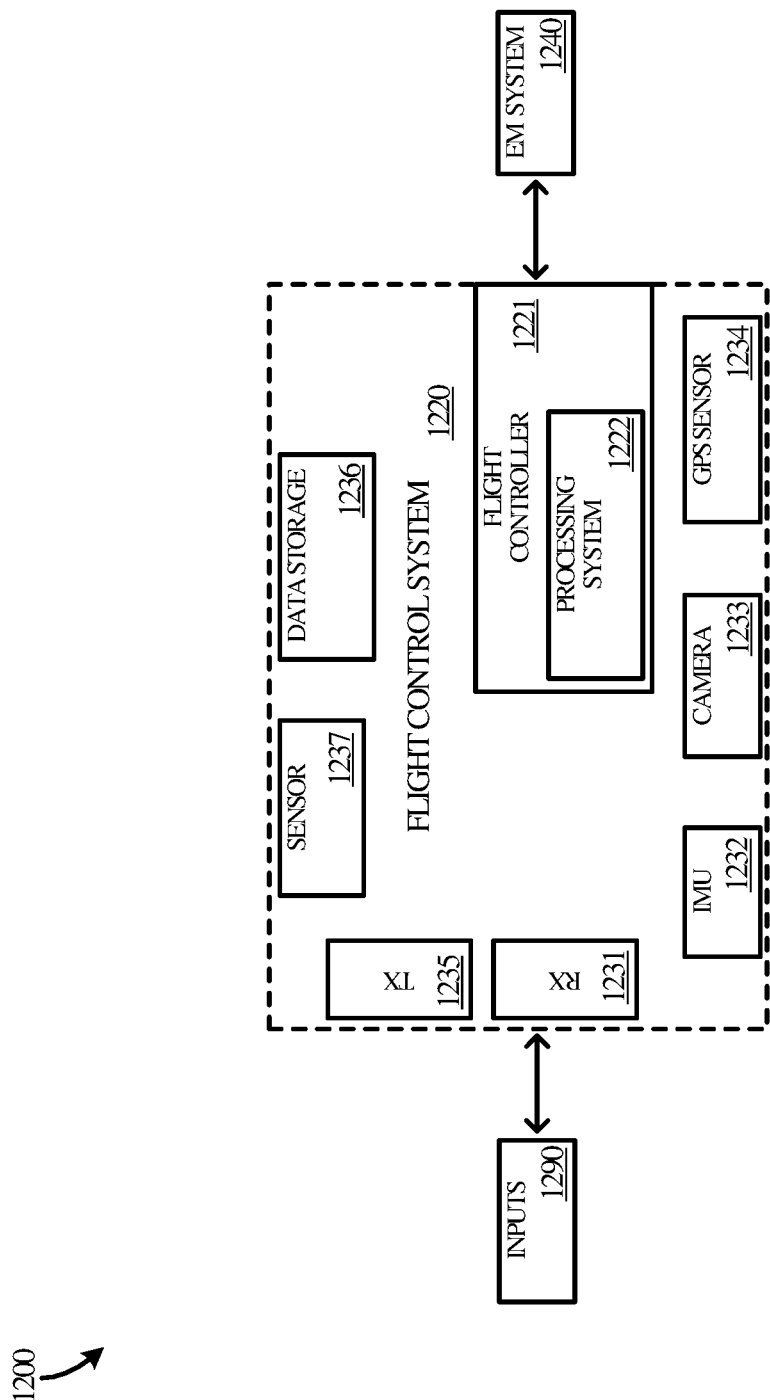
FIG. 12 illustrates a systems architecture of a UAV in an implementation.

FIG. 4 illustrates process 400 implemented by a vehicle, such as vehicle 130 of FIG. 1, for transferring data files to a destination. Process 400 may be implemented in program instructions in the context of any of the software applications, services, micro-services, modules, components, or other such elements of a vehicle, of which vehicle systems architecture 1200 of FIG. 12 is representative. The program instructions direct the vehicle to operate as follows, referring parenthetically to the steps in FIG. 4 and in the singular for the sake of clarity.

In an implementation, the vehicle is tasked by a vehicle operations service with performing a task which includes transferring data produced by one or more elements onboard the vehicle (step 401). In various implementations, the vehicle stores a data file including data gathered in the process performing the task. The data file onboard the vehicle may include imaging data from onboard sensors such as cameras or other detectors, video data such as livestream or recorded video, and telemetry data which describes the position of the vehicle at various times during a task or mission. The data file can also include a custom or proprietary data format. In various implementations, the vehicle encrypts the data file according to an encryption key provided in the task assignment or that is native to the vehicle.

Continuing with the exemplary implementation, the vehicle stores the collected data in a data file which has a unique identifier constructed by concatenating various parameters relating to the vehicle and/or to the task. For example, the unique identifier may include parameters such as a task or flight identifier, a vehicle identifier, an organizational identifier for an organization associated with the vehicle or the data, an indication of the data type, an indication of the element sourcing or producing the data, and so on. The vehicle, in wireless communication with a relay resource operating on a computing device such as a controller or ground station, sends a request to the relay resource to transfer the data file to some destination (step 402). The request includes the unique identifier of the data file. Communication and other data transfers between the vehicle and the relay resource may be facilitated by an API for requesting the file transfer and/or for the file transfer. The relay resource then relays the transfer request to a cloud service which determines transfer instructions based on the file's unique identifier. The cloud service sends the transfer instructions to the relay resource. In various implementations, the vehicle then transmits the data file to the relay resource which executes the file transfer according to the transfer instructions.

In an implementation, the relay resource may operate onboard the vehicle, executed by the vehicle's flight control system. The relay resource may communicate with the cloud service to request and receive transfer instructions via the vehicle's Internet or network connectivity.

Referring again to FIG. 1, operational environment 100 illustrates a brief example of processes 200, 300, and 400 as employed by vehicle operations service 110, relay resource 140, and UAV 130.

In operation, a tasking service of vehicle operations service 110 assigns a task to vehicle 130 which will entail the collection of task data by the equipment onboard vehicle 130. For example, the task data may be imaging data, such as photographs, video recordings, or livestream video, environmental data measured by any of various onboard sensors, telemetry data which can include location coordinates, vehicle performance data such as vehicle operating data, or other custom-configured or proprietary data or data formats. The task data may also indicate a destination for data files, such as a cloud-based data storage or other content handler such as a video relay service for livestream video, a content service operated by vehicle operations service 110, or some other file repository.

Vehicle 130 constructs a unique identifier for each data file of data collected during the task. The unique identifier may be constructed according to a naming convention comprising various parameters relating to the task, the data, or the vehicle. Vehicle operations service 110 may generate a unique identifier by concatenating one or more of various parameters of the flight or task, such as a flight identifier, a task identifier, a vehicle model designation, vehicle identifier, a pilot identifier, and/or a data type or kind (e.g., "nav_cam"). In an implementation, to ensure that the unique identifier is unique among the systems and services with which UAV 130 is in communication, the naming convention may also specify appending a randomized set of characters to the identifier. Vehicle operations service 110 stores transfer instructions including destination information in a transfer log or database according to one or more of the parameters used to create the unique identifier. The destination information stored in the data may include a web address for the destination, authentication keys or access tokens, file compression requirements, encryption keys, and so on.

In other implementations, vehicle operations service 110 may create a unique identifier which is provided to vehicle 130 when the task is assigned and which vehicle operations service 110 stores, along with the corresponding transfer instructions, in the transfer log or database.

When vehicle 130 completes the assigned task, or as data files are created, vehicle 130 will send to relay resource 140 a list of unique identifiers of data files available for transfer, such as for uploading to a cloud data storage. Alternatively or additionally, vehicle 130 may send the list when a flight is initiated, when a flight is terminated, or when vehicle 130 is within range of a wireless access point with sufficient signal strength.

Relay resource 140 receives the list of one or more unique identifiers from vehicle 130 which it transmits to vehicle operations service 110 in a request for transfer instructions for the data files. Relay resource 140 may execute on a computing device in wireless communication with vehicle 130, such as controller. Alternatively, relay resource 140 may execute onboard vehicle 130. Upon receiving the list of unique identifiers from relay resource 140, vehicle operations service 110 determines transfer instructions for the data files by accessing the transfer log or database of destinations and transfer instructions correlated to parameters extracted from the unique file identifiers. Vehicle operations service 110 transmits the transfer instructions to relay resource 140. When relay resource 140 receives the transfer instructions from vehicle operations service 110, relay resource 140 downloads the data files from vehicle 130. Relay resource 140 then transfers or uploads the data files to the respective destinations of the data files according to the transfer instructions.

In various implementations, when transfer of a data file is complete, relay resource 140 obtains confirmation of the successful file upload from destination 150. With upload confirmed, relay resource 140 transmits an indication to vehicle 130 to delete the data file from its onboard storage. The indication to delete may be transmitting a transfer confirmation to vehicle 130 which prompts vehicle 130 to perform the deletion, or the indication may be a command to delete the file. In various implementations, vehicle operations service 110 may receive confirmation of the successful upload from destination 150 which may be further communicated to the client application where the task was created. Vehicle operations service 110 may also communicate the confirmation to relay resource 140.

Figure 5:
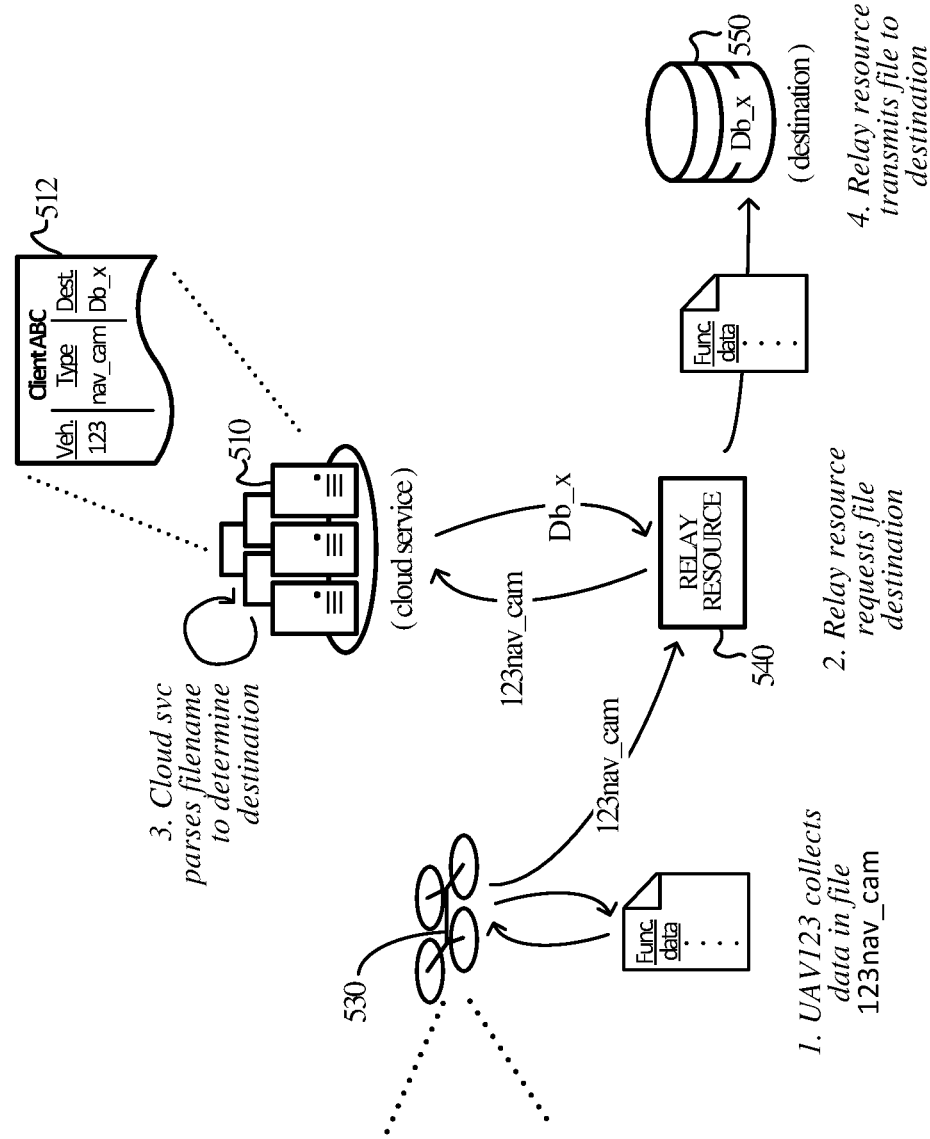
FIG. 5 illustrates an operational scenario for transferring data from an unmanned aerial vehicle in an implementation.

FIG. 5 illustrates operational scenario 500 for managing file transfer from an unmanned aerial vehicle in an implementation which is highly simplified for clarity. In operational scenario 500, and referring parenthetically to the numbered steps, vehicle 530 ("UAV123"), representative of a UAV such as a quadcopter, collects data from a navigation camera onboard vehicle 530 and stores the collected data in a data file "123nav_cam" (step 1). Vehicle 530 sends a request, which includes the file's unique identifier "123nav_cam," to relay resource 540 to transfer the file. In this example, the file's unique identifier is constructed according to a naming convention which combines a vehicle identifier with an indication of the vehicle element sourcing the data.

Upon receiving the transfer request from vehicle 530, relay resource 540, executing on a controller, ground station, docking station, base station, or mobile computing device in wireless communication with vehicle 530, relays the transfer request including the unique file identifier to cloud service 510 (step 2). Cloud service 510 is representative of a cloud-based vehicle operations or file transfer service which manages or orchestrates file transfers for UAVs such as vehicle 530. Cloud service 510 maintains transfer database 512 which stores transfer instructions for data files to be downloaded from UAVs. In an implementation, transfer database 512 stores data records comprising various parameters relating to the vehicles, the task, flight, or mission of the vehicle, the data collected, and/or other parameters, along with transfer instructions. The transfer instructions can include destination information comprising a web address or URL of the destination, an authentication for file transfers using an API of the destination, encryption information, and/or file format or compression information.

Cloud service 510 receives the transfer request from relay resource 540. Cloud service 510 determines transfer instructions for file "123nav_cam" from database 512 (step 3). Cloud service 540 parses the file's unique identifier "123nav_cam" for parameters indicating a vehicle identifier and an element of the vehicle producing the data. Cloud service 540 determines the transfer instructions for the file, including destination information, based at least on the parameters extracted from the unique file identifier. From database 512, cloud service 510 determines that the destination of the file is destination 550 (database "Db_x"). Cloud service 510 sends the transfer instructions including information for transferring the file to "Db_x" to relay resource 540.

Upon receiving the transfer instructions for file "123nav_cam," relay resource downloads the file from vehicle 530 and transfers the file to destination 550 according to the transfer instructions (step 4). In an implementation, relay resource 540 transfers the file using an API associated with destination 550 and for which an access or authentication token may be provided in the transfer instructions. When file transfer is complete, destination 550 may transmit via its API a confirmation of the upload to relay resource 540. Relay resource 540 may send the confirmation to vehicle 530, prompting vehicle 530 to delete the file from its onboard data storage. In various implementations, relay resource 540 may notify cloud service 510 of the successful upload so that cloud service 510 can update database 512 with the information.

Figure 6:
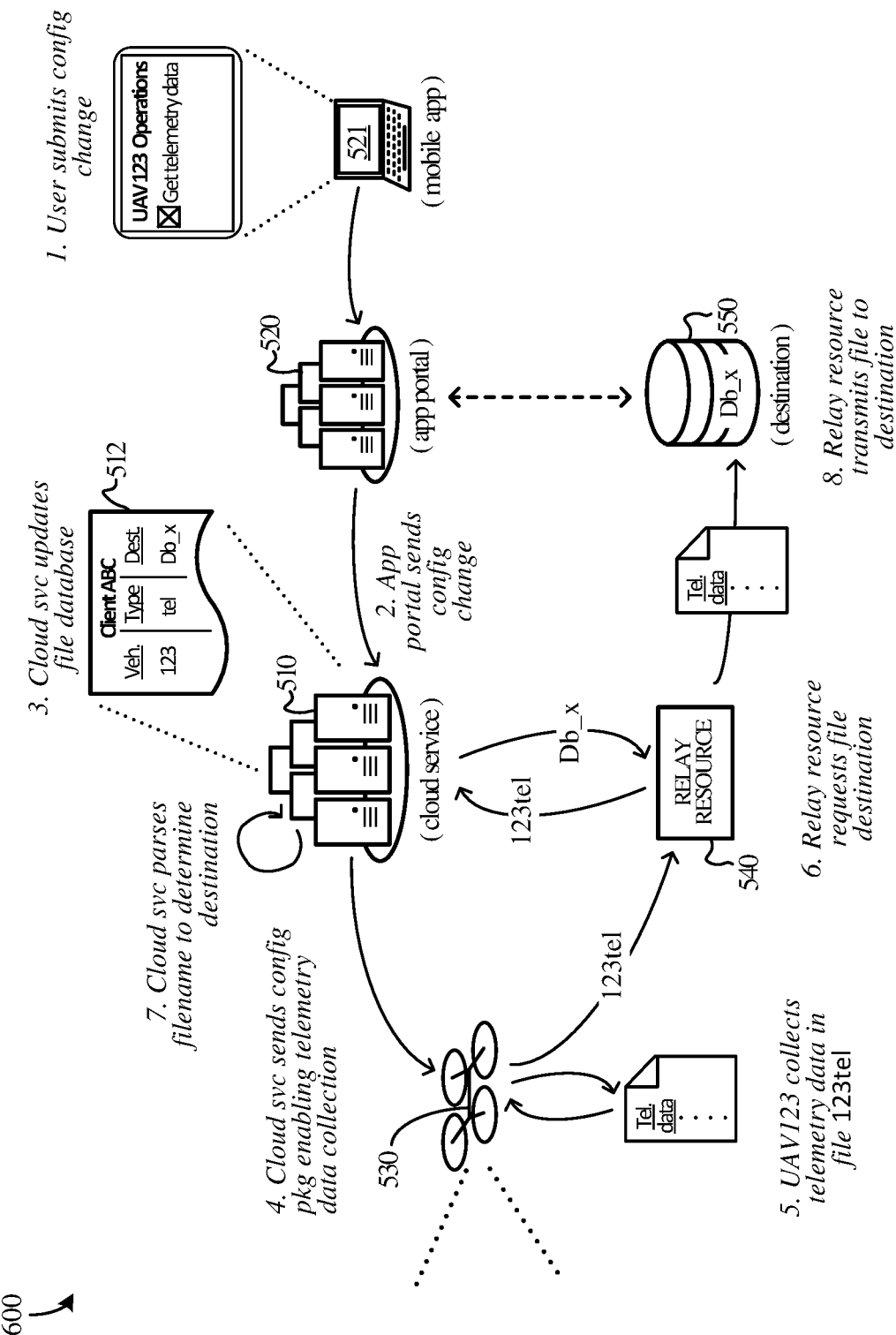
FIG. 6 illustrates another operational scenario for transferring data from an unmanned aerial vehicle in an implementation.

FIG. 6 illustrates operational scenario 600 for managing file transfer from an unmanned aerial vehicle in an implementation which is highly simplified for clarity. In operational scenario 500, and referring parenthetically to the numbered steps, an end-user at computing device 521, such as personnel affiliated with an organization operating vehicle 530, initiates a configuration change for vehicle 530 ("UAV123") via the user interface of a client application executing on computing device 521 (step 1). In this example, the configuration change enables telemetry data collection. The client application sends an indication of the configuration change to application portal 520 of cloud service 510. Application portal 520 transmits the configuration change to cloud service 510 (step 2). Cloud service 510 updates transfer database 512 for client "ABC" to indicate that data files for telemetry data from "UAV123" are to be stored in database "Db_x" (step 3). Cloud service 510 also sends a configuration package to vehicle 530 comprising one or more operational settings for vehicle 530 which enable telemetry data collection (step 4). For example, a telemetry data application may execute onboard vehicle 530 to capture telemetry data from a vehicle element such as a GPS receiver.

During its next flight or task, vehicle 530 collects telemetry data and stores the data in a data file with the unique filename "123tel" (step 5). The unique filename is constructed according to a naming convention which concatenates a vehicle identifier with a data type. When the file is ready for transfer, such as at the conclusion of the flight or task or when vehicle 530 returning to its docking station, for example, vehicle 530 sends a request to relay resource 540 to transfer the file. Relay resource 540 sends the request including the file's unique identifier to cloud service 510 (step 6). Cloud service 510 parses the filename according to the naming convention to extract the vehicle identifier and the data type (step 7). Consulting the transfer database for the client associated with vehicle 530, cloud service 510 determines that the destination for file "123tel" is destination 550 (database "Db_x"). Cloud service 510 sends the transfer instructions including the destination information to relay resource 540. Relay resource 540 downloads the telemetry data file from vehicle 530 and sends it to destination 550 via its API.

Figure 7:
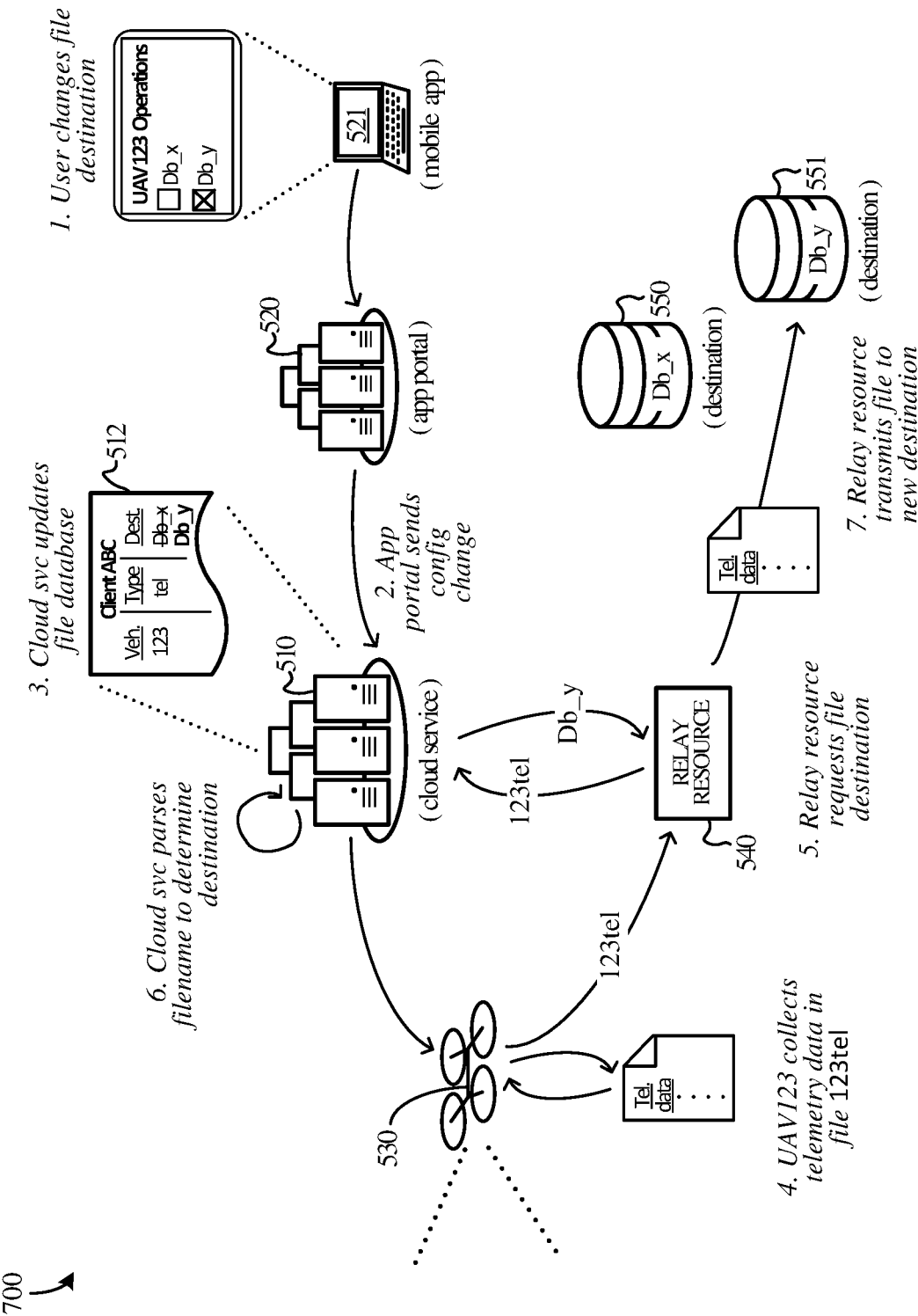
FIG. 7 illustrates yet another operational scenario for transferring data from an unmanned aerial vehicle in an implementation.

Turning now to FIG. 7, FIG. 7 illustrates operational scenario 700, an implementation similar to operational scenario 600. In operational scenario 700, the end-user at computing device 521 changes the destination for telemetry data files of "UAV123" from database "Db_x" to database "Db_y" (step 1). Application portal 520, receiving user input from computing device 521 comprising an indication of the change, sends information for the configuration change to cloud service 510 (step 2). Cloud service 510 updates file transfer database 512 to indicate the new location for the telemetry data files of "UAV123" (step 3).

Subsequent to the change in destination, vehicle 530 performs a flight or task during which telemetry data is collected (step 4). When relay resource 540 requests transfer instructions for the telemetry data file "123tel" (step 5), cloud service 510 determines the file destination according to the extracted parameters of the filename (step 6) and replies to the request with transfer instructions indicating the new destination. Relay resource 540 obtains the data file from vehicle 530 and transfers the file to destination 551 (database "Db_y") (step 7).

Figure 8:
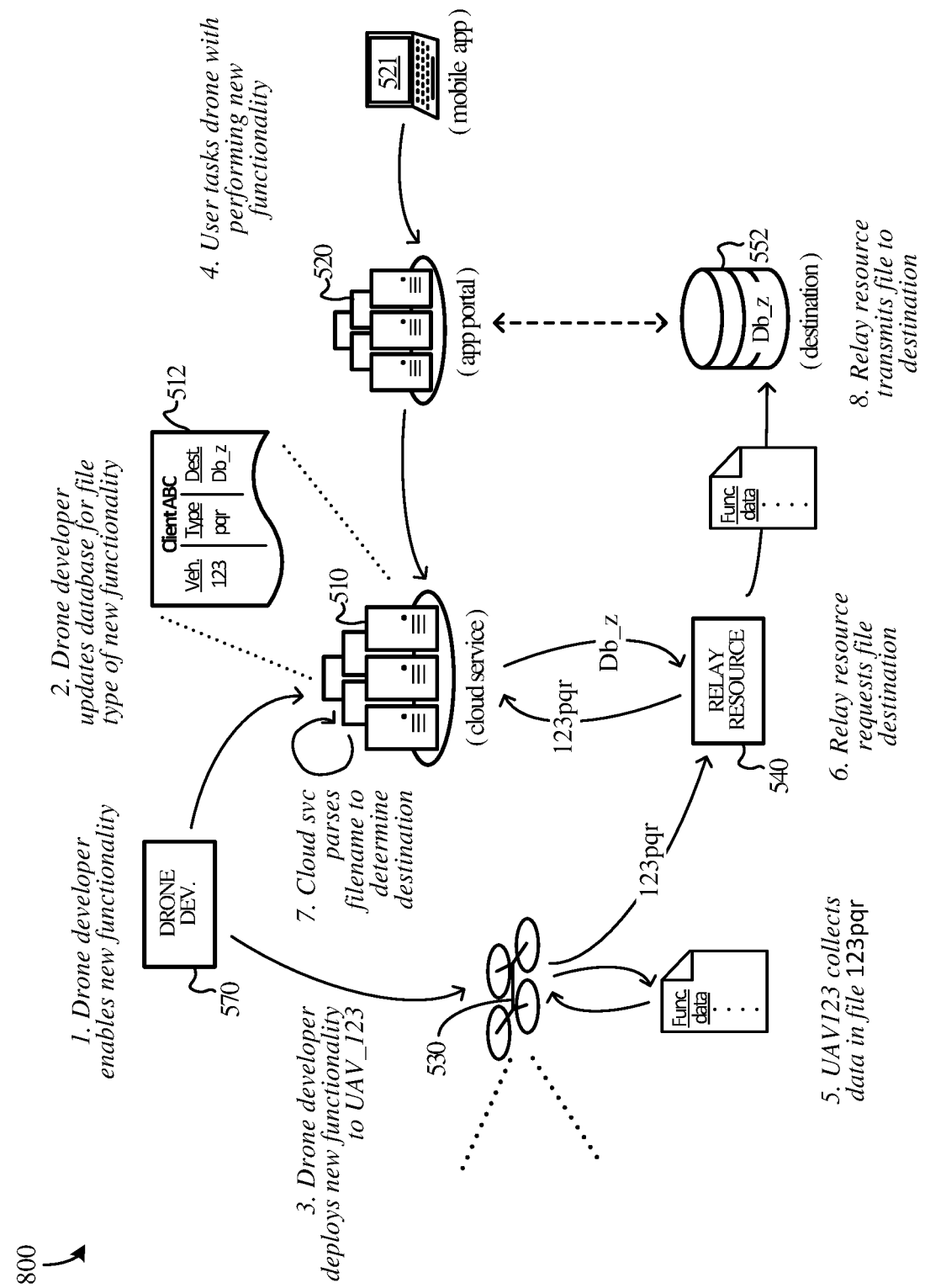
FIG. 8 illustrates still another operational scenario for transferring data from an unmanned aerial vehicle in an implementation.

FIG. 8 illustrates operational scenario 800, an implementation similar to operational scenarios 600 and 700. In operational scenario 800, drone developer 570 develops a new UAV capability or functionality (step 1). Drone developer 570 updates transfer database 512 with respect to how data files associated with the new functionality are to be stored, including information such as a filename parameter, a data type and destination of the files (step 2). Drone developer 570 deploys the new functionality to vehicle 530 ("UAV123") which can include updating the operating system of vehicle 530 and/or reallocating onboard data storage of vehicle 530 (step 3).

Subsequent to the deployment of the functionality, a user tasks vehicle 530 with collecting and transferring data collected by the new functionality (step 4). Application portal 520 transmits the user's task directive to cloud service 510 via an operations API for assignment to vehicle 530. In operation, vehicle 530 collects data associated with the new functionality and stores the data in data file "123pqr" (step 5). When the task is complete or the data file is otherwise ready for transfer, vehicle 530 sends a file transfer request to relay resource 540, wherein the request includes the unique file identifier "123pqr." Relay resource 540 transmits the request to cloud service 510 via a relay API which is different from the operations API of cloud service 510 (step 6). Cloud service 510 parses the identifier to extract parameters for determining transfer instructions (step 7). With the updated information in database 512, cloud service 510 determines the file destination for file "123pqr" is database "Db_z" per the vehicle identifier and file type information extracted from the filename. In an implementation, database 512 may be organized according to the organization associated with the various vehicles referenced in database 512.

Relay resource 540 receives transfer instructions for data file "123pqr" from cloud service 510 via the relay API, obtains the file from vehicle 530, and uploads it to destination 522 ("Db_z") according to the transfer instructions (step 8). In an implementation, the transfer instructions provide an account name or number and an API access or authentication token or key by which relay resource 540 can use an API associated with destination 522 to upload the file. With data file "123pqr" uploaded to destination 522, relay resource 540 may direct vehicle 530 to delete the file from its onboard storage.

In some implementations, when relay resource 540 receives the transfer instructions from cloud service 510, relay resource 540 may transfer the instructions to vehicle 530 for vehicle 530 to transfer the data file to destination 552, wherein vehicle 530 has direct Internet connectivity having established a connection to a wireless access point such as a Wifi router.

In still other implementations, relay resource 540 may obtain the data file from vehicle 530 and store the file until the computing device on which relay resource 540 is operating (e.g., a controller or mobile computing device) detects sufficient signal strength to complete the file transfer.

Figure 9:
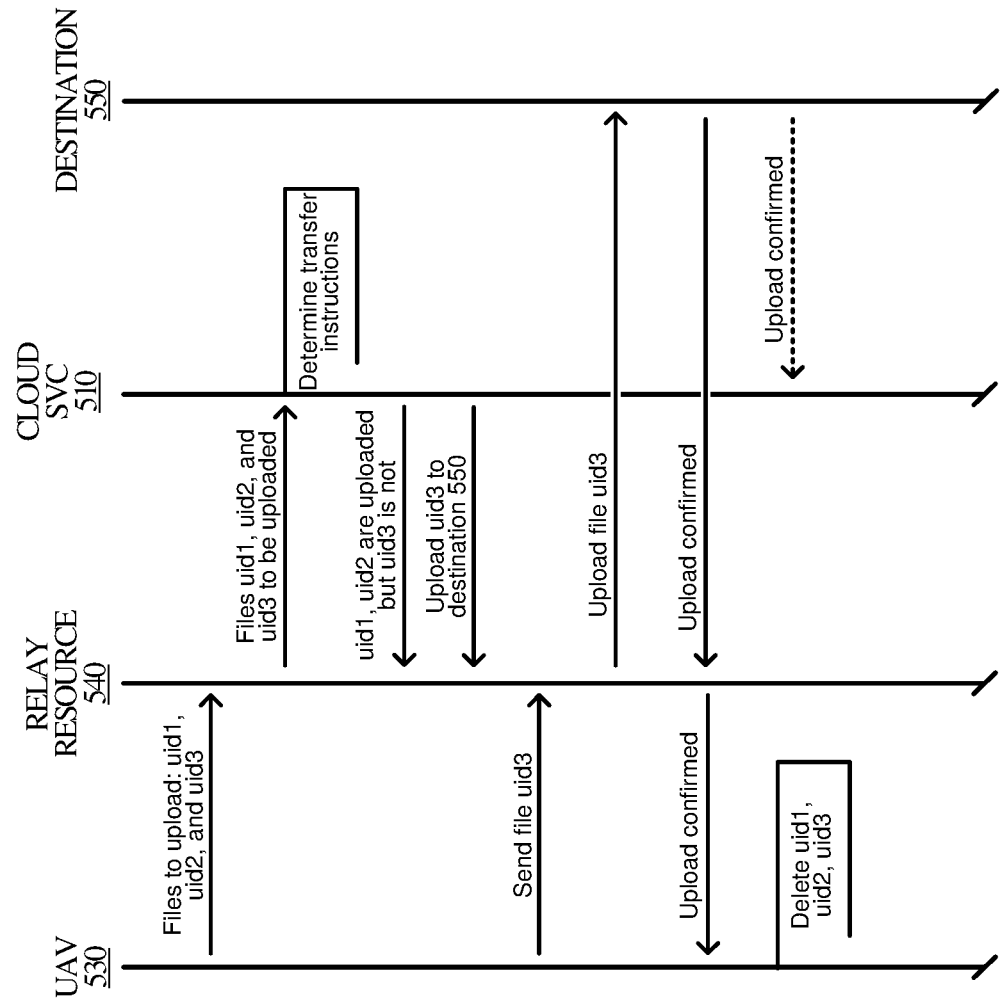
FIG. 9 illustrates an operational scenario for transferring data files from an unmanned aerial vehicle in an implementation.

FIG. 9 illustrates operational scenario 900 which is representative of various processes, such as processes 200, 300, and 400, associated with managing data file transfers in an implementation, referring to the elements of operational scenario 500 of a system for transferring data files illustrated in FIG. 5.

In an implementation, vehicle 530 sends to relay resource 540 the unique identifiers of files stored onboard vehicle 530, "uid1," "uid2," and "uid3," which are to be uploaded to various destinations. Relay resource 540 receives the unique identifiers and relays the identifiers to cloud service 510 in a request for instructions for transferring the files.

Upon receiving the identifiers from relay resource 540, cloud service 510 consults a transfer database for instructions for transferring data files from UAVs managed by vehicle operations service 510. Cloud service 510 may execute one or more services relating to vehicle operations such as data file transfer management. Cloud service 510 receives the unique file identifiers and determines the transfer instructions by consulting a transfer database maintained by cloud service 510. The database may comprise information which correlates transfer instructions for data files to various parameters relating to the vehicle which produced the data, the task during which the data was produced, the type of data collected, the user initiating the task involving the data production, and so on. The database may also store data file status information, such as an upload status for a file. Cloud service 510 determines that "uid1" and "uid2" have already been uploaded and therefore do not require transfer. Cloud service 510 also determines that "uid3" must be uploaded to destination 550. Cloud service 510 transmits the transfer instructions for "uid3" to relay resource 540 including information for uploading the data file to destination 550.

When relay resource 540 receives the transfer instructions for "uid3" from cloud service 510, relay resource 540 downloads "uid3" from vehicle 530, then uploads "uid3" to destination 550 according to the transfer instructions. When the transfer is complete, destination 550 transmits confirmation of the upload to relay resource 540, which relay resource 540 then communicates to vehicle 530. When vehicle 530 receives confirmation that the files have been uploaded to their respective destinations, it deletes the files from its onboard data storage. In an implementation, cloud service 510 may solicit and receive from destination 550 confirmation of the upload to update the file status in the transfer database.

Figure 10:
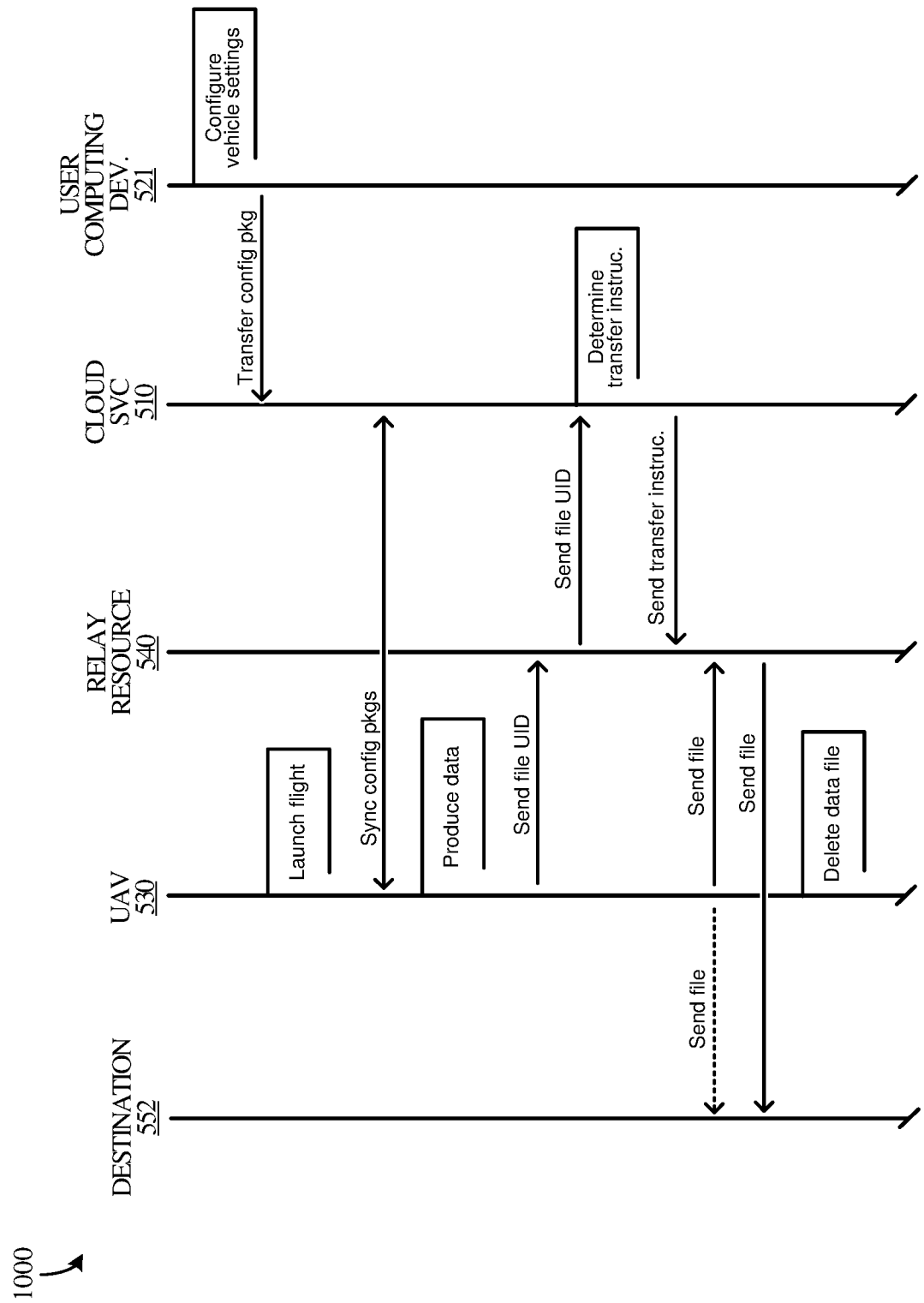
FIG. 10 illustrates an operational scenario for transferring data files from an unmanned aerial vehicle involving a configuration change in an implementation.

FIG. 10 illustrates operational scenario 1000 which is representative of various processes, such as processes 200, 300, and 400, associated with managing data file transfers in an implementation, referring to the elements of operational scenario 600 of a system for transferring data files illustrated in FIG. 6.

In operational scenario 1000, a user, such as a drone pilot, drone dispatcher, or other personnel associated with vehicle 530, enables a vehicle configuration for vehicle 530 via the user interface of a client application for managing vehicle operations executing on computing device 512. The vehicle configuration enabled by the user includes tasking vehicle 530 with transferring data produced by elements operating onboard from vehicle 530, such as sensors (e.g., cameras) or receivers. For example, the user may enable an operations upgrade, for example, purchasing a "premium" operations package, which enables a premium functionality such as telemetry data collection, higher resolution photography, or enhanced (e.g., longer) video recording. User input comprising vehicle settings which enable the vehicle configuration are sent to cloud service 510 via application portal 520 (not shown). Cloud service 510 receives a vehicle configuration package comprising vehicle settings for enabling the operations upgrade.

Subsequent to the user enabling the operations upgrade, vehicle 530 launches a flight. At launch, vehicle 530 communicates with cloud service 510 to synchronize configuration packages relating to vehicle operations. Cloud service 510 determines that the configuration package for the operations upgrade must be installed on vehicle 530 and transfers the configuration package to vehicle 530 via an API.

In flight, one or more elements onboard vehicle 530 produces data in accordance with the newly installed operations upgrade. The flight control system onboard vehicle 530 stores the data produced in a data file with a unique filename. The unique filename is constructed by the flight control system or by an onboard data management system by concatenating parameters relating to the flight during which the data was produced, the vehicle, the sensor or receiver producing the data, the user or user's organization, or the data type. Vehicle 530 transmits the unique filename to relay resource 540 in a request to transfer the file.

Relay resource 540 sends the unique filename to cloud service 510 to solicit transfer instructions for the data file. Cloud service 510 parses the filename to determine the transfer instructions. Using parameters extracted from the unique filename, cloud service 510 determines that the destination of the data file is destination 552. Cloud service 510 sends instructions for transferring the data file including information for uploading the data file to destination 522, such as login credentials, encryption keys, etc.

Upon receiving the transfer instructions from cloud service 510, relay resource 540 downloads the data file from vehicle 530, then uploads it to destination 552 according to the transfer instructions. In some implementations, relay resource 540 may send the transfer instructions to vehicle 530 for vehicle 530 to effect the transfer. When vehicle 530 receives confirmation of the file upload to destination 552, for example, from relay resource 540 or from destination 552 after a direct upload, vehicle 530 deletes the file from its onboard file storage.

Figure 11:
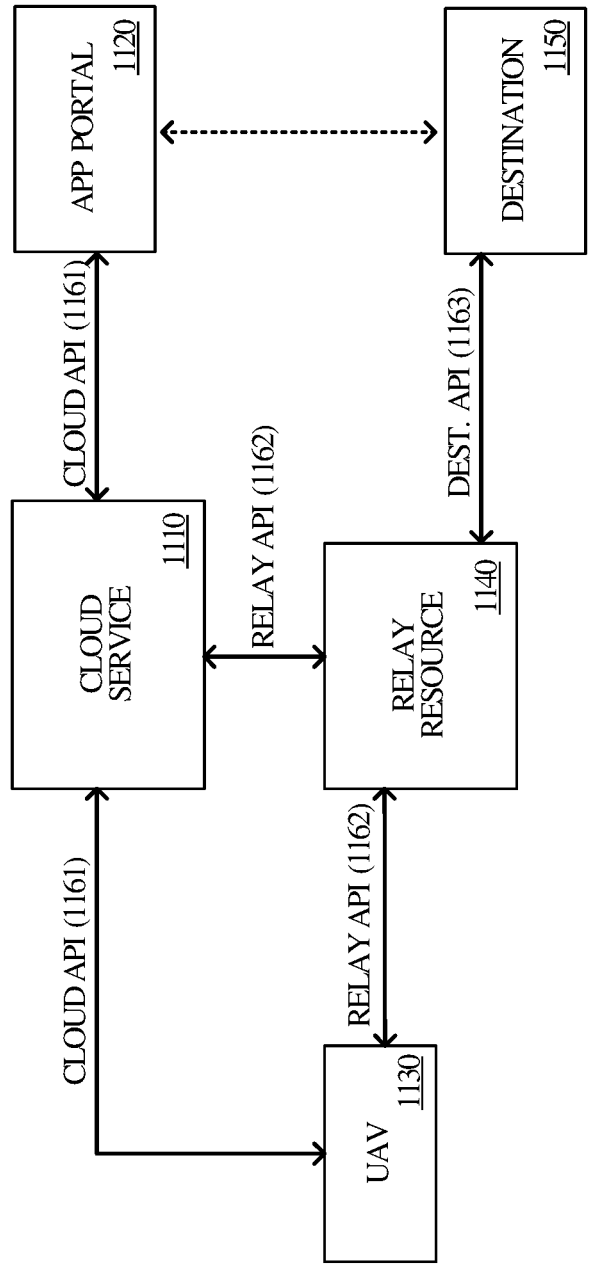
FIG. 11 illustrates a software systems architecture for data transfer for unmanned aerial vehicles in an implementation.

FIG. 11 illustrates software systems architecture 1100 for the technology disclosed herein in an implementation. Software systems architecture 1100 includes cloud service 1110 in communication with application portal 1120, vehicle (UAV) 1130, and relay resource 1140. Relay resource 1140 is in communication with destination 1150. Application portal 1120 may also communicate with destination 1150. It may be appreciated by those skilled in the art that other connections or channels of communication may be present between components of software systems architecture 1110 which are not shown for the sake of clarity.

In an implementation, cloud service 1110 communicates with vehicle 1130 via cloud API 1161. Using cloud API 1161, cloud service 1110 may transmit task information or configuration packages to vehicle 1130. Cloud service 1110 may also receive information relating to vehicle 1130 status or operations.

In an implementation, cloud service 1110 also communicates with application portal 1120 via cloud API 1161 which facilitates access by web applications hosted by application portal 1120 to various vehicle services supported by cloud service 1110. For example, an end-user may schedule a mission which tasks vehicle 1130 with transferring data produced onboard vehicle 1130. Cloud service 1110 then assigns the mission to vehicle 1130 via cloud API 1161.

In configuring a task or mission for vehicle 1130 via application portal 1120, an end-user may specify a location for receiving and storing the data collected by vehicle 1130 in performing a task. In other implementations, cloud service 1110 may determine a destination for task data based on the type of data, the organization with which the vehicle or end-user is associated, or some other attribute of the task or mission. The end-user may be presented in the user interface with the ability to access, download, or view the data via cloud API 1161, while backend data storage and transfer is managed by cloud service 1110. Alternatively, the end-user may access task data stored at destination 1150 via destination API 1163.

Relay resource 1140 communicates with cloud service 1110 via relay API 1162 to transmit file transfer requests to and receive transfer instructions from cloud service 1110. In various implementations, relay resource 1140 also receives file transfer requests and data files slated for transfer from vehicle 1130 via relay API 1162. In various implementations, relay API 1162 is different from cloud API 1161.

When relay resource 1140 receives transfer instructions from cloud service 1110 via relay API 1162, relay resource 1140 may upload the data file from vehicle 1130 to destination 1150 via destination API 1163 supported by or associated with destination 1150. The end-user may also access, download, and/or view data, including on-demand or livestream data, via the user interface of the web application, wherein application portal 1120 communicates with destination 1150 to download and display the data.

Continuing with FIG. 11, in an implementation, relay API 1162 facilitates file transfer from vehicle 1130 by abstracting individual file transfer functions (performed, for example, by multiple APIs) away from vehicle 1130, relay resource 1140, and application portal 1120 so that data transfer is orchestrated by cloud service 1110 as a single point of contact for data transfer operations. Vehicle 1130 is agnostic to file handling beyond its interaction with relay resource 1140. Similarly, relay resource 1140 requests and receives transfer instructions on demand from cloud service 1110 at the time of transfer. In an implementation where relay resource 1140 executes on a mobile device, relay resource 1140 may store the data file received from vehicle 1130 until the wireless connection signal strength detected by the mobile device is of sufficient strength for the file to be transferred to destination 1150.

In an implementation, cloud service 1110 tracks file transfer information according to a data file's unique identifier in, for example, a transfer log or database. When a data file is to be downloaded from vehicle 1130, vehicle 1130 transmits the unique identifier to relay resource 1140 via relay API 1162. Relay resource 1140 then requests and receives transfer instructions for the unique identifier from cloud service 1110 via relay API 1162. When relay resource 1140 receives the transfer instructions, it downloads the data file from vehicle 1130 via relay API 1162, then transfers the data file to its destination, such as destination 1150 via destination API 1150.

Destination 1150 may be a third-party cloud service provider which receives data from relay resource 1140 and other endpoints via destination API 1163. In an implementation, relay resource 1140 sends a data file including data produced onboard by vehicle 1130 to destination 1150 via destination API 1163. Relay resource 140 may use an API key or access token provided in the transfer instructions received from cloud service 1110 to enable the file transfer. Destination 1150 may send confirmation of a successful file upload to relay resource 1140 via and/or to cloud service 1110 via destination API 1163. With the upload confirmed, vehicle 1130 may be notified by relay resource 1140 or cloud service 1110 that the data file stored onboard can now be safely deleted.

In some implementations, vehicle 1130 may upload the data file directly to destination 1150 via destination API 1163, having received transfer instructions relayed by relay resource 1140 from cloud service 1110. Vehicle 1130 may receive confirmation of the file transfer directly from destination 1150 via destination API 1163, upon receipt of which vehicle 1130 deletes the file from its onboard data storage.

In still other implementations, relay resource 1140 may comprise a service executing onboard an Internet-connected vehicle 1130, communicating with cloud-based services such as cloud service 1110 and destination 1150 for file transfer operations.

FIG. 12 illustrates systems architecture 1200 of a UAV, such as vehicle 130 of FIG. 1, in an implementation. Systems architecture 1200 includes flight control system 1220, electromechanical system 1240, and operational inputs 1290. Flight control system 1220 comprises one or more receivers (RX) 1231 for receiving operational inputs 1290, such as wireless network communication or flight commands from a controller. Flight control system 1220 further comprises flight controller 1221, inertial measurement unit (IMU) 1232, camera 1233, GPS sensor 1234, transmitter (TX) 1235, and data storage 1236. Data storage 1236 includes persistent or nonvolatile memory or a removable memory card (e.g., an SD card) for recording flight and sensor data gathered from onboard devices, including photos or video captured by onboard cameras, or for storing programmed flight programs for use by the UAV. Flight control system 1220 may also comprise one or more other sensors 1237 such as barometers, altimeters, additional cameras, heat-detecting sensors, electromagnetic sensors (e.g., infrared or ultraviolet), anemometers or wind sensors, magnetometers, and so on. Onboard camera 1233 comprises a device for capturing imaging data, such as video or still photography, across visible and other wavelengths of the electromagnetic spectrum, such as ultraviolet or infrared wavelengths.

Electromechanical system 1240 provides the propulsion for the UAV, typically comprising an electronic speed controller which throttles one or more rotors according to flight instructions received from flight control system 1220. It may be appreciated that both flight control system 1220 and electromechanical system 1240 can include other elements in addition to (or in place of) those disclosed herein, which are illustrated for exemplary purposes.

Turning now to FIG. 13, architecture 1300 illustrates computing device 1301 that is representative of any system or collection of systems in which the various processes, programs, services, and scenarios disclosed herein may be implemented. Examples of computing device 1301 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 1301 may be implemented as a single apparatus, system, or device or may be implemented in a distributed manner as multiple apparatuses, systems, or devices. Computing device 1301 includes, but is not limited to, processing system 1302, storage system 1303, software 1305, communication interface system 1307, and user interface system 909 (optional). Processing system 1302 is operatively coupled with storage system 1303, communication interface system 1307, and user interface system 909.

Processing system 1302 loads and executes software 1305 from storage system 1303. Software 1305 includes and implements UAV data transfer process 1306, which is representative of the UAV data transfer processes discussed with respect to the preceding Figures, such as processes 200, 300, and 400. When executed by processing system 1302, software 1305 directs processing system 1302 to operate as described herein for at least the various processes, operational scenarios, and sequences discussed in the foregoing implementations. Computing device 1301 may optionally include additional devices, features, or functionality not discussed for purposes of brevity.

Referring still to FIG. 13, processing system 1302 may comprise a micro-processor and other circuitry that retrieves and executes software 1305 from storage system 1303. Processing system 1302 may be implemented within a single processing device but may also be distributed across multiple processing devices or sub-systems that cooperate in executing program instructions. Examples of processing system 1302 include general purpose central processing units, graphical processing units, application specific processors, and logic devices, as well as any other type of processing device, combinations, or variations thereof.

Storage system 1303 may comprise any computer readable storage media readable by processing system 1302 and capable of storing software 1305. Storage system 1303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1303 may also include computer readable communication media over which at least some of software 1305 may be communicated internally or externally. Storage system 1303 may be implemented as a single storage device but may also be implemented across multiple storage devices or sub-systems co-located or distributed relative to each other. Storage system 1303 may comprise additional elements, such as a controller, capable of communicating with processing system 1302 or possibly other systems.

Software 1305 (including UAV data transfer process 1306) may be implemented in program instructions and among other functions may, when executed by processing system 1302, direct processing system 1302 to operate as described with respect to the various operational scenarios, sequences, and processes illustrated herein. For example, software 1305 may include program instructions for implementing the UAV data transfer processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1305 may include additional processes, programs, or components, such as operating system software, virtualization software, or other application software. Software 1305 may also comprise firmware or some other form of machine-readable processing instructions executable by processing system 1302.

In general, software 1305 may, when loaded into processing system 1302 and executed, transform a suitable apparatus, system, or device (of which computing device 1301 is representative) overall from a general-purpose computing system into a special-purpose computing system customized to support sensor device deployments and swaps. Indeed, encoding software 1305 on storage system 1303 may transform the physical structure of storage system 1303. The specific transformation of the physical structure may depend on various factors in different implementations of this description. Examples of such factors may include, but are not limited to, the technology used to implement the storage media of storage system 1303 and whether the computer-storage media are characterized as primary or secondary, etc.

For example, if the computer readable storage media are implemented as semiconductor-based memory, software 1305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1307 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 1301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method of managing data transfer for unmanned aerial vehicles comprising, by a cloud service:
   receiving, via a first application programming interface (API) between the cloud service and an application portal, information tasking an unmanned aerial vehicle with transferring task data produced by one or more elements onboard the unmanned aerial vehicle;
   receiving, via a second API between a relay resource and the cloud service, a request from the relay resource for instructions to transfer a data file downloaded from the unmanned aerial vehicle, wherein the request includes a filename for the data file, wherein the data file includes the task data produced by the one or more elements onboard the unmanned aerial vehicle, and wherein the filename includes an identifier;
   determining the instructions to transfer the data file based on the identifier of the data file to be transferred, wherein the instructions include a destination; and
   replying to the relay resource with the instructions via the second API, wherein the instructions include information for uploading the data file to the destination.

2. The computer-implemented method of claim 1 further comprising, by the relay resource:
   receiving, from the unmanned aerial vehicle, the request to transfer the data file;
   sending, to the cloud service via the second API, the request to transfer the data file; and
   receiving, from the cloud service via the second API, the instructions for transferring the data file;
   receiving the data file from the unmanned aerial vehicle; and
   sending the data file to the destination according to the instructions.

3. The computer-implemented method of claim 2 further comprising, by the unmanned aerial vehicle:
   sending, to the relay resource, the request to transfer the data file and the data file for transfer to the destination.

4. The computer-implemented method of claim 3 further comprising, by the unmanned aerial vehicle:
   receiving, from the relay resource, a confirmation of file transfer to the destination; and
   deleting the data file from onboard data storage.

5. The computer-implemented method of claim 1 further comprising, by the unmanned aerial vehicle:
sending, to the relay resource, the request to transfer the data file and the data file for transfer to the destination;
receiving, from the relay resource, a confirmation of file transfer to the destination; and
deleting the data file from onboard data storage.

6. The computer-implemented method of claim 5, wherein the tasking information comprises a configuration package of vehicle settings enabling the one or more elements onboard the unmanned aerial vehicle to produce the task data.

7. The computer-implemented method of claim 1, wherein the identifier comprises a portion of the filename configured according to a naming convention.

8. One or more computer readable storage media having program instructions stored thereon that, when executed by one or more processors operatively coupled to the one or more computer readable storage media, direct a computing apparatus to at least:
receive a request from an unmanned aerial vehicle to transfer a data file from the unmanned aerial vehicle, wherein the request includes a filename for the data file, wherein the filename includes an identifier;
send the request to a cloud service via an application programming interface (API) for instructions for transferring the data file, wherein the request includes the filename; and
receive, from the cloud service via the API, instructions for transferring the data file to a destination based on the identifier, wherein the instructions for transferring the data file were stored by the cloud service in association with the identifier.

9. The one or more computer readable storage media of claim 8, the program instructions further directing the computing apparatus to:
receive the data file from the unmanned aerial vehicle; and
send the data file to the destination according to the instructions.

10. The one or more computer readable storage media of claim 9, the program instructions further directing the computing apparatus to:
receive, from the destination, a confirmation of file transfer; and
send, to the unmanned aerial vehicle, the confirmation of file transfer.

11. The one or more computer readable storage media of claim 8, wherein the program instructions further directing the computing apparatus to send the instructions for transferring the data file to the unmanned aerial vehicle.

12. The one or more computer readable storage media of claim 8, wherein the computing apparatus receives the request to transfer the data file from the unmanned aerial vehicle via the API.

13. The one or more computer readable storage media of claim 8, wherein the computing apparatus executes onboard the unmanned aerial vehicle.

14. The one or more computer readable storage media of claim 8, wherein the destination comprises a cloud data storage.

15. An unmanned aerial vehicle comprising:
a flight control system onboard the unmanned aerial vehicle comprising one or more processors; and
one or more computer readable storage media having program instructions stored thereon that, when executed by the one or more processors of the flight control system, direct the flight control system to at least:
receive, from a cloud service, information tasking the unmanned aerial vehicle with transferring data produced by one or more elements onboard the unmanned aerial vehicle, wherein the cloud service received the information from an application portal via a first application programming interface (API); and
send, to a relay resource, a request to transfer a data file, wherein the request includes a filename for the data file, wherein the data file includes the data produced by the one or more elements onboard the unmanned aerial vehicle, wherein the filename includes an identifier, and wherein the relay resource obtains instructions for transferring the data file to a destination from the cloud service via a second API based on the identifier, wherein the instructions for transferring the data file are stored by the cloud service in association with the identifier.

16. The unmanned aerial vehicle of claim 15, wherein the program instructions further direct the flight control system to:
send, to the relay resource via the second API, the data file for transfer to a destination; and,
upon receiving a confirmation of file transfer to the destination from the relay resource, delete the data file from onboard data storage.

17. The unmanned aerial vehicle of claim 15, wherein the program instructions further direct the flight control system to:
receive, from the relay resource via the second API, instructions for transferring the data file, wherein the relay resource received the instructions from the cloud service and wherein the instructions are stored by the cloud service in association with the identifier of the data file; and
transfer the data file to the destination according to the instructions.

18. The unmanned aerial vehicle of claim 15, wherein the tasking information comprises a configuration package of vehicle settings configuring the one or more elements onboard the unmanned aerial vehicle to produce data.

19. The unmanned aerial vehicle of claim 18, wherein the vehicle settings comprise settings relating to enhanced data production, and wherein the cloud service received the configuration package from an application portal, and wherein the application portal received an instruction to send the configuration package to the unmanned aerial vehicle from an end-user computing device in communication with the application portal.

20. The unmanned aerial vehicle of claim 15, wherein the program instructions further direct the flight control system to operate the relay resource onboard the unmanned aerial vehicle.

* * * * *